US011915575B2

(12) United States Patent
Madhavan et al.

(10) Patent No.: US 11,915,575 B2
(45) Date of Patent: Feb. 27, 2024

(54) SANITATION MANAGEMENT BASED ON DIGITAL TWIN

(71) Applicant: INTERNATIONAL BUSINESS MACHINES CORPORATION, Armonk, NY (US)

(72) Inventors: Samaya Madhavan, Eulesss, TX (US); Partho Ghosh, Kolkata (IN); Laura Jane Bennett, Alameda, CA (US); Anamita Guha, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 17/303,555

(22) Filed: Jun. 2, 2021

(65) Prior Publication Data

US 2022/0392330 A1    Dec. 8, 2022

(51) Int. Cl.
| | | |
|---|---|---|
| *G08B 21/24* | (2006.01) | |
| *G02B 27/01* | (2006.01) | |
| *G06F 18/213* | (2023.01) | |
| *G06F 18/214* | (2023.01) | |
| *G06F 18/21* | (2023.01) | |

(52) U.S. Cl.
CPC ....... *G08B 21/245* (2013.01); *G02B 27/0172* (2013.01); *G06F 18/213* (2023.01); *G06F 18/214* (2023.01); *G06F 18/2178* (2023.01); *G02B 2027/014* (2013.01); *G02B 2027/0138* (2013.01)

(58) Field of Classification Search
CPC . G08B 21/245; G06F 18/2178; G06F 18/214; G06F 18/213; G02B 27/0172

USPC ........................................................ 340/573.1
See application file for complete search history.

(56) References Cited

U.S. PATENT DOCUMENTS

| | | | |
|---|---|---|---|
| 6,426,701 B1 | 7/2002 | Levy | |
| 8,909,151 B2 | 12/2014 | Kasher | |
| 10,078,956 B1 | 9/2018 | Kusens | |
| 10,692,355 B2 | 6/2020 | Waghode | |
| 2015/0127365 A1* | 5/2015 | Rizvi | G06V 40/28 705/2 |
| 2017/0029003 A1 | 2/2017 | Crowley | |
| 2020/0074835 A1* | 3/2020 | Waghode | G16H 40/20 |
| 2020/0191726 A1 | 6/2020 | Waanders | |
| 2020/0397546 A1* | 12/2020 | Miller | H02J 7/00 |
| 2021/0303894 A1* | 9/2021 | Lei | G06F 18/214 |

(Continued)

FOREIGN PATENT DOCUMENTS

| | | |
|---|---|---|
| CN | 110731820 A | 1/2020 |
| CN | 110755287 A | 2/2020 |

OTHER PUBLICATIONS

Disclosed Anonomously, "Machine Learning Based Smart Home Notification System", IPCOM000258646D, May 31, 2019, pp. 1-2.

(Continued)

*Primary Examiner* — Kerri L McNally
(74) *Attorney, Agent, or Firm* — Steven M. Bouknight

(57) ABSTRACT

The exemplary embodiments disclose a method, a computer program product, and a computer system for managing sanitation. The exemplary embodiments may include collecting data of one or more assets, extracting one or more features from the collected data, and evaluating a state of sanitation of the one or more assets based on applying one or more models to the extracted features.

17 Claims, 6 Drawing Sheets

(56) References Cited

U.S. PATENT DOCUMENTS

2021/0341395 A1* 11/2021 Harvey ................. G06T 7/0002
2022/0027601 A1* 1/2022 Bhardwaj .............. G06V 20/10

OTHER PUBLICATIONS

Disclosed Anonomously, "Robotic Cleaning Machine To Identify Item Re-Usability During Cleansing Operations", IPCOM000261262D, Feb. 14, 2020, pp. 1-6.

Disclosed Anonomously, "Selective Provision of Notifications To Devices That Are Offline", IPCOM000252279D, Jan. 3, 2018, pp. 1-9.

Disclosed Anonymously, "User Notification Interface Using Internet of Things Devices", IPCOM000255200D, Sep. 10, 2018, pp. 1-24.

Dyson et al., "Investigating the use of an electronic hand hygiene monitoring and prompt device: Influence and acceptability", https://www.ncbi.nlm.nih.gov/pmc/articles/PMC5761932/, Nov. 2017, pp. 1-14.

Halliburton, "Digital Transformation-Smart and Connected Oilfield Operations", 2017, pp. 1-25.

Karaduman et al., "IoT based Hand Hygiene Compliance Monitoring", IEEE, https://ieeexplore.ieee.org/document/8909151, 2019, pp. 1-3.

Matheson, "Smart devices track hand-washing in hospitals to help reduce the spread of infection", https://medicalxpress.com/news/2015-02-smart-devices-track-hand-wash . . . , Feb. 2, 2015, pp. 1-5.

Mell et al., "The NIST Definition of Cloud Computing", National Institute of Standards and Technology, Special Publication 800-145, Sep. 2011, pp. 1-7.

Samsung, "A Journey Towards a Sustainable Future", https://www.samsung.com/us/aboutsamsung/sustainability/strategy/, 2020, pp. 1-136.

* cited by examiner

SANITATION MANAGEMENT BASED ON DIGITAL TWIN

BACKGROUND

The exemplary embodiments relate generally to sanitation, and more particularly to managing sanitation conditions based on data.

Lack of proper sanitation or hygiene may result in an increased rate of spread of germs or viruses. Many people forget to sanitize their hands after interacting with doorknobs and other communal items that may be vulnerable to germs and viruses. Many people are unaware of which communal items have been exposed to germs and viruses. Many people need to be notified or reminded to properly sanitize their hands and other items.

SUMMARY

The exemplary embodiments disclose a method, a computer program product, and a computer system for managing sanitation. The exemplary embodiments may include collecting data of one or more assets, extracting one or more features from the collected data, and evaluating a state of sanitation of the one or more assets based on applying one or more models to the extracted features.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
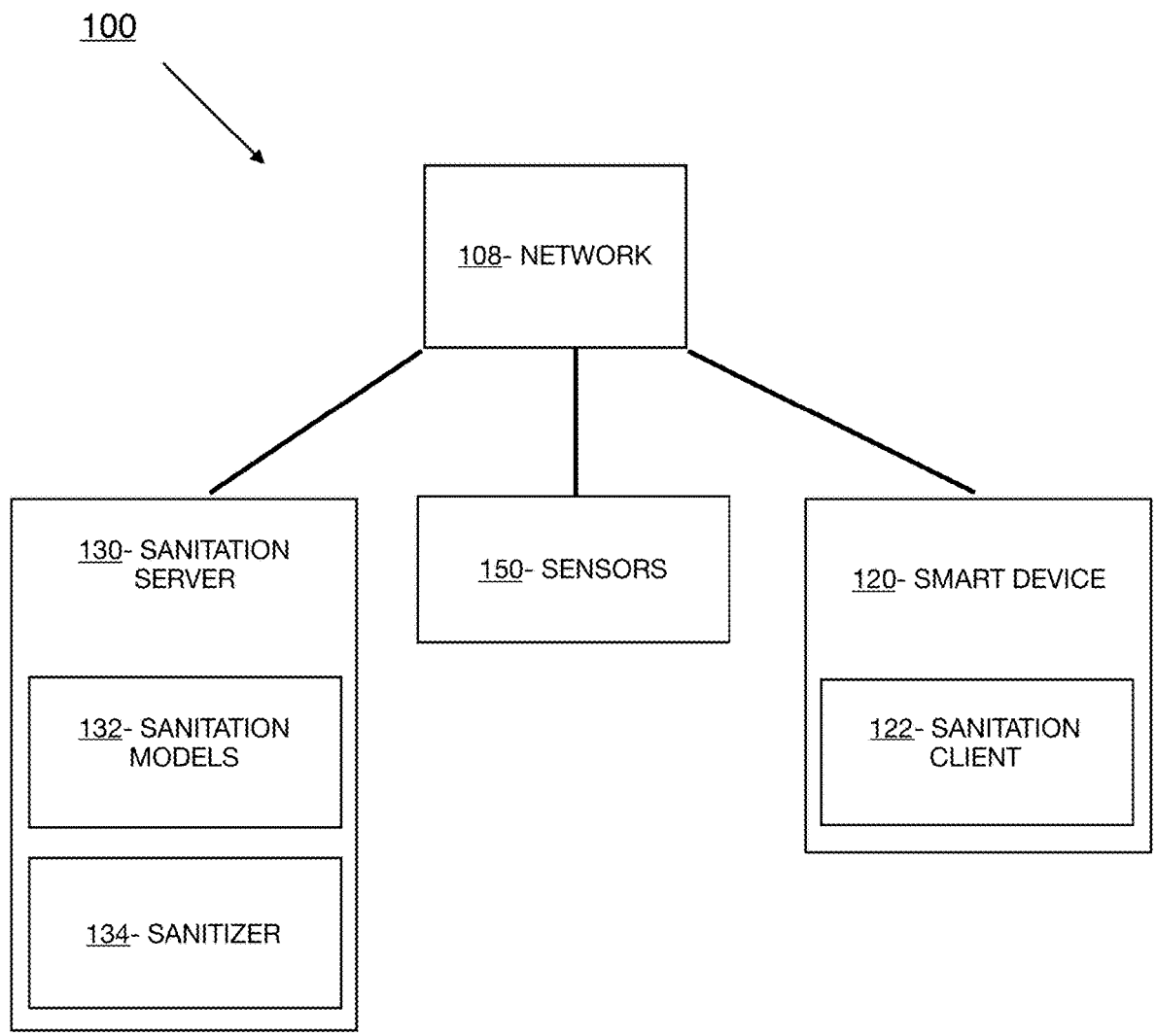
FIG. 1 depicts an exemplary schematic diagram of a sanitation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Lack of proper sanitation or hygiene may result in an increased rate of spread of germs or viruses. Many people forget to sanitize their hands after interacting with doorknobs and other communal items that may be vulnerable to germs and viruses. Many people are unaware of which communal items have been exposed to germs and viruses. Many people need to be notified or reminded to properly sanitize their hands and other items.

Exemplary embodiments are directed to a method, computer program product, and computer system that will manage sanitation. In embodiments, machine learning may be used to create models capable of evaluating a state of sanitation, while feedback loops may improve upon such models. Moreover, data from sensors, the internet, and user profiles may be utilized to improve the evaluation of a sanitation state. In embodiments, sanitation states may be evaluated for one or more facilities (i.e., office, kitchen, warehouse, etc.), people, or assets (i.e., doorknobs, light switches, refrigerator handle, stair rail, elevator buttons, pets, etc.). In embodiments, sanitation recommendations may be made, and may include washing, scrubbing, wiping, disinfecting, etc. hands, surfaces, handles, animals, people, etc. For example, many people may touch a refrigerator door handle in an office kitchen, and it may need to be sanitized by wiping with a disinfecting wipe. In another example, a person may shake hands with multiple friends and may need to sanitize their hands by washing them with soap and water. In general, it will be appreciated that embodiments described herein may relate to sanitizing any person or thing within any surrounding environment for any motivation.

FIG. 1 depicts the sanitation system 100, in accordance with the exemplary embodiments. According to the exemplary embodiments, the sanitation system 100 may include a smart device 120, a sanitation server 130, and sensors 150, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the sanitation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a sanitation client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The sanitation client 122 may be a software and/or hardware application capable of communicating with and providing a user interface for a user to interact with the sanitation server 130 via the network 108. The sanitation client 122 may act as a client in a client-server relationship. Moreover, in the example embodiment, the sanitation client 122 may be capable of transferring data between the smart device 120 and other devices via the network 108. In embodiments, the sanitizer 134 utilizes various wired and wireless connection protocols for data transmission and exchange, including Bluetooth, 2.4 gHz and 5 gHz internet, near-field communication, Z-Wave, Zigbee, etc. The sanitation client 122 is described in greater detail with respect to FIG. 2.

In the exemplary embodiments, the one or more sensors 150 may be a camera, light sensor, infrared sensor, movement detection sensor, touch sensor, olfactory sensor, proximity sensor, localization sensor, barometer, thermometer, humidity sensor, decibel sensor, or other sensory hardware/ software equipment. In embodiments, the sensors 150 may be integrated with and communicate directly with smart devices such as the smart device 120, e.g., smart phones and laptops. In embodiments, the sensors 150 may be external (i.e., standalone devices) connected to the smart device 120 or the network 108. In embodiments, the sensors 150 may be incorporated within an environment in which the sanitation system 100 is implemented. For example, in embodiments, the sensors 150 may be cameras fastened to a wall, video cameras fastened to a refrigerator, etc., and may communicate via the network 108. The sensors 150 are described in greater detail with respect to FIG. 2.

In the exemplary embodiments, the sanitation server 130 includes one or more sanitation models 132 and a sanitizer 134. The sanitation server 130 may act as a server in a client-server relationship with the sanitation client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the sanitation server 130 is shown as a single device, in other embodiments, the sanitation server 130 may be comprised of a cluster or plurality of computing devices, working together or working independently. The sanitation server 130 is described in greater detail as a hardware implementation with reference to FIG. 4, as part of a cloud implementation with reference to FIG. 5, and/or as utilizing functional abstraction layers for processing with reference to FIG. 6.

The sanitation models 132 may be one or more algorithms modelling a correlation between one or more features and an evaluation of a state of sanitation. The one or more features may include sanitation features of one or more assets (i.e., people, animals, objects) such as exposure events, timestamps of exposure events, severities of exposure events, sanitation events, timestamps of sanitation events, and severities of sanitation events, and may be detected and extracted via the one or more sensors 150 and the network 108. In embodiments, the sanitation models 132 may weight the features based on an effect that the one or more features have on the evaluation of a state of sanitation. In the example embodiment, the sanitizer 134 may generate the sanitation models 132 using machine learning methods, such as neural networks, deep learning, hierarchical learning, Gaussian Mixture modelling, Hidden Markov modelling, and K-Means, K-Medoids, or Fuzzy C-Means learning, etc. The sanitation models 132 are described in greater detail with reference to FIG. 2.

The sanitizer 134 may be a software and/or hardware program capable of receiving training data, extracting features from the training data, and training one or more models based on the extracted features. The sanitizer 134 may further receive a configuration of the sanitation system 100. Moreover, the sanitizer 134 may collect current data, extract features from the current data, and apply the trained one or more models to evaluate a state of sanitation. The sanitizer 134 may be further configured for notifying one or more users of the state of sanitation and making one or more sanitation recommendations based on the state of sanitation. Lastly, the sanitizer 134 is capable of collecting new data, re-evaluating one or more states of sanitation based on the new data, and modifying the one or more models. The sanitizer 134 is described in greater detail with reference to FIG. 2.

Figure 2:
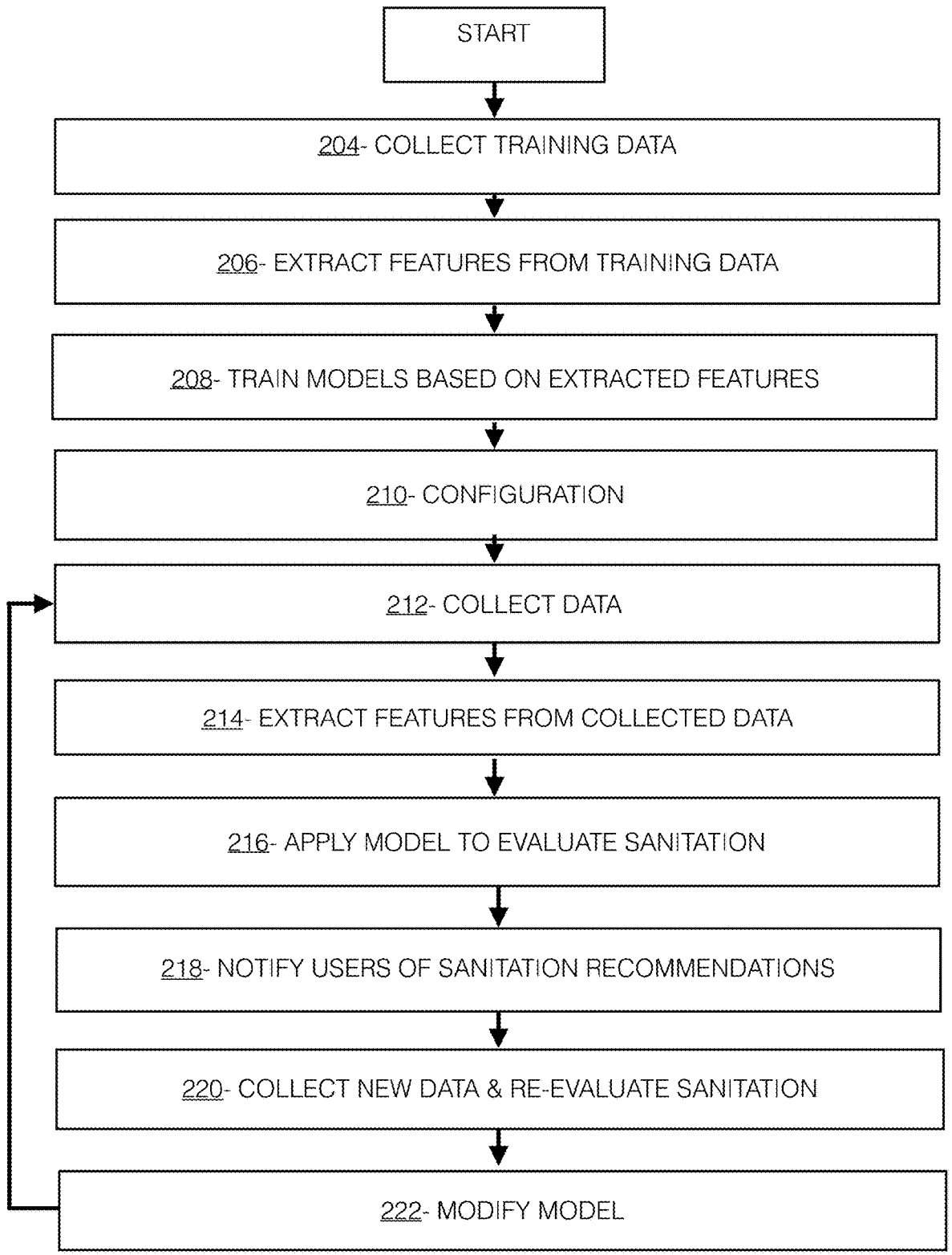
FIG. 2 depicts an exemplary flowchart illustrating the operations of a sanitizer 134 of the sanitation system 100 in sanitizing, in accordance with the exemplary embodiments.

FIG. 2 depicts an exemplary flowchart illustrating the operations of a sanitizer 134 of the sanitation system 100 in managing sanitation, in accordance with the exemplary embodiments.

The sanitizer 134 may collect and/or receive training data (step 204). In embodiments, training data may include data of exposure events and/or sanitation events of one or more assets associated with one or more evaluations of sanitation states of the assets. For example, the sanitizer 134 may collect video footage of various people touching a refrigerator door handle after interacting with various foods, coughing into their hands, petting their pets, etc. The sanitizer 134 may further collect an associated evaluation of the refrigerator door handle such as a sanitation score on a scale of 1-10, 1-100, A-D, etc. In embodiments, collected training data may be labelled with actual germ amounts. For example, the sanitizer 134 may collect video data of people's interactions with a surface and additionally a count or prevalence of bacteria, germs, viruses, etc. on the surface (i.e., collected by one or more swabs). The sanitizer 134 may additionally collect data of exposure events and/or sanitation events of one or more assets such as audio data, location data from one or more GPS sensors (i.e. in wearable devices or other smart devices 120), proximity data from one or more proximity or localization sensors, weather data from one or more thermometers, barometers, humidity sensors, etc. The sanitizer 134 may collect and/or receive training data from the network 108, one or more databases (i.e., one or more digital twins), and/or the sensors 150.

To further illustrate the operations of the sanitizer 134, reference is now made to an illustrative example where the sanitizer 134 collects training data consisting of video footage of various assets and associated sanitation evaluations of the assets from video camera sensors 150.

The sanitizer 134 may extract one or more features from the collected and/or received training data (step 206). The extracted features may be extracted from the collected training data, which may include data collected via user upload/input, databases, or the sensors 150, etc. of one or more assets (i.e., people, animals, objects, etc.). The extracted features may include sanitation features of one or more assets (i.e., people, animals, objects) such as exposure events, timestamps of exposure events, severities of exposure events, sanitation events, timestamps of sanitation events, and severities of sanitation events. In embodiments, the sanitizer 134 may use techniques such as feature extraction, timestamp analysis, optical character recognition, image processing, video processing, pattern/template matching, data comparison, etc. to identify features such as exposure events, timestamps of exposure events, severities of exposure events, sanitation events, timestamps of sanitation events, and severities of sanitation events. For example, the sanitizer 134 may extract exposure and sanitation events and associated timestamps of the events from collected video footage via timestamp analysis and video processing. In embodiments, the sanitizer 134 may extract various interactions between or among assets (i.e., people, animals, objects) such as touching, sneezing, coughing, existing with close proximity, etc. as exposure events via image processing, video processing, data comparison, etc. For example, the sanitizer 134 may extract an exposure event from video footage showing four friends standing in a circle less than three feet apart from one another because of their close proximity. In embodiments, the sanitizer 134 may extract various interactions between or among assets (i.e., people, animals, objects) such as washing, wiping with disinfectant, using hand sanitizer, etc. as sanitation events via image processing, video processing, data comparison, etc. For example, the sanitizer 134 may extract a sanitation event from video footage showing a person wipe down a kitchen counter with a disinfecting wipe. The sanitizer 134 may additionally extract severities of exposure and sanitation events via image processing, video processing, data comparison, etc. For example, the sanitizer 134 may extract a higher severity of exposure for a group of four people interacting together than for a group of two people interacting together. In another example, if a person washes their hands thoroughly with soap and water for two minutes, the sanitizer 134 may extract a high severity for the sanitation event. In an additional example, if a person wipes a surface with a disinfecting wipe once and leaves behind residue or dirt on the surface, the sanitizer 134 may extract a low severity for the sanitation event. The sanitizer 134 may later associate extracted features with one or more sanitation evaluations when training one or more models.

With reference again to the previously introduced example where the sanitizer 134 collects training data, the sanitizer 134 extracts sanitation features of the assets of the training data such as exposure events, timestamps of exposure events, severities of exposure events, sanitation events, timestamps of sanitation events, and severities of sanitation events from the collected training data.

The sanitizer 134 may train one or more sanitation models 132 based on the collected training data linked or associated with sanitation evaluations or scores (step 208). In embodiments, the sanitizer 134 may train one or more sanitation models 132 based on an association between sanitation scores of assets and features associated with the assets. For example, assets with many exposure events of high severity and few sanitation events of low severity may be associated with a low sanitation score (i.e., 1 on a scale of 1-10, D on a scale of A-D). Conversely, assets with few exposure events of low severity and many sanitation events of high severity may be associated with a high sanitation score (i.e., 10 on a scale of 1-10, A on a scale of A-D). Thus, the sanitizer 134 trains the sanitation models 132 to capture the correlations between known evaluations (i.e., 1-10, A-D) and known features, for example exposure events, timestamps of exposure events, severities of exposure events, sanitation events, timestamps of sanitation events, and severities of sanitation events. Moreover, such features may be weighted such that features more associated with an evaluation of sanitation may count more than those that are not. Following the training process, the sanitation models 132 may then be input features, or lack thereof, for an unevaluated asset from which a most likely evaluation may be output. In embodiments, multiple sanitation models 132 may be trained for evaluating the sanitation of different types of assets, for example, different sanitation models 132 for evaluating people, animals, and objects.

With reference again to the previously introduced example where the sanitizer 134 extracts sanitation features of the assets of the training data, the sanitizer 134 trains a sanitation model 132 based on associations between the evaluations of sanitation of assets and the sanitation features extracted from the collected training data.

The sanitizer 134 may receive a configuration (step 210). The sanitizer 134 may be configured by receiving information such as a user registration and user preferences. The user registration and user preferences may be uploaded by a user or administrator, i.e., the owner of the smart device 120 or the administrator of smart device 120. In the example embodiment, the configuration may be received by the sanitizer 134 via the sanitation client 122 and the network 108, and/or may also involve receiving or extracting databases. Receiving the user registration may involve receiving information such as a name, phone number, email address, account credentials (i.e., telephone account, video-chat/web conference, etc.), company name, serial number, smart device 120 type, sensors 150 types, and the like. For example, the sanitizer 134 may extract spreadsheets, logs, digital twins, etc. of sanitation history, asset placement history (i.e., maps of buildings, facilities, communal items, etc.) weather history, evaluations of sanitation, etc. from one or more databases. Evaluations of sanitation extracted from databases may be used to train one or more models.

During configuration, the sanitizer 134 may further receive user preferences (step 210 continued). User preferences may include a specification of an area of interest to be evaluated (i.e., building, facility, room, etc.). The sanitizer 134 may further receive user preferences for the manner in which the sanitizer 134 should notify one or more users of a sanitation evaluation or recommendation. For example, a user may upload user preferences specifying that they are to be notified of a low sanitation evaluation in the form of a notification to their smart device 120. In another example, a user may wear virtual or augmented reality glasses and specify that they are to be notified of a low sanitation evaluation in the form of a notification on their virtual or augmented reality glasses.

With reference again to the previously introduced example where the sanitizer 134 trains a sanitation model 132 based on an association of the extracted features with one or more sanitation evaluations, the user uploads a user registration including the user's name, user's smartphone as smart device 120, video cameras fixed on walls of a facility as sensors 150, and an area of interest to be evaluated. The user also uploads user preferences specifying that they are to be notified of a low sanitation evaluation visually via the screen of their smart device 120.

The sanitizer 134 may collect and/or receive data (step 212). In embodiments, collected data may include data of exposure events and/or sanitation events of one or more assets associated with one or more evaluations of sanitation states of the assets. For example, the sanitizer 134 may collect video footage of various people touching a refrigerator door handle after interacting with various foods, coughing into their hands, petting their pets, etc. The sanitizer 134 may additionally collect data of exposure events and/or sanitation events of one or more assets such as audio data, location data from one or more GPS sensors (i.e. in wearable devices or other smart devices 120), proximity data from one or more proximity or localization sensors, weather data from one or more thermometers, barometers, humidity sensors, etc. The sanitizer 134 may collect and/or receive data from the network 108, one or more databases (i.e., one or more digital twins), and/or the sensors 150.

With reference again to the previously introduced example where the sanitizer 134 receives a configuration, the sanitizer 134 collects video footage data of multiple people cooking and cleaning in a kitchen from video camera sensors 150.

The sanitizer 134 may extract features from the collected and/or received data (step 214). The sanitizer 134 may extract one or more features from the collected data in the same manner as described above with respect to extracting features from the training data. However, the sanitizer 134 extracts one or more features from the current collected data instead of from the previously collected training data.

With reference again to the previously introduced example where the sanitizer 134 collects current data, the sanitizer 134 extracts sanitation features of assets (i.e., people, animals, objects) such as exposure events, timestamps of exposure events, severities of exposure events, sanitation events, timestamps of sanitation events, and severities of sanitation events.

The sanitizer 134 may apply the one or more sanitation models 132 to the extracted features to evaluate sanitation (step 216). In embodiments, the sanitizer 134 may apply the one or more sanitation models 132 to the extracted features to evaluate the sanitation of the area of interest. As previously mentioned, such extracted features may include sanitation features of assets (i.e., people, animals, objects) such as exposure events, timestamps of exposure events, severities of exposure events, sanitation events, timestamps of sanitation events, and severities of sanitation events, and the one or more sanitation models 132 may be generated through machine learning techniques such as neural networks. In embodiments, the one or more sanitation models 132 may be trained at initialization and/or through the use of a feedback loop to weight the features such that features shown to have a greater correlation with evaluating a state of sanitation are weighted greater than those features that are not. In embodiments, the sanitizer 134 may assign each asset (person, object, animal, etc.) a sanitation score on a scale of 1-10, 1-100, A-D, etc. Based on the extracted features and weights associated with such extracted features, the sanitizer 134 may evaluate the sanitation of one or more areas of interest.

With reference again to the previously introduced example where the sanitizer 134 extracts sanitation features of assets (i.e., people, animals, objects) such as exposure events, timestamps of exposure events, severities of exposure events, sanitation events, timestamps of sanitation events, and severities of sanitation events from the collected data, the sanitizer 134 evaluates the sanitation of the kitchen to be evaluated and determines that the kitchen refrigerator handle and microwave oven handle need to be sanitized.

Upon the sanitizer 134 determining one or more sanitation evaluations, the sanitizer 134 may notify the user of the sanitation evaluation (step 218). The sanitizer 134 may notify the user and/or others in the form of audio, video, text, or any other manner via the smart device 120, a virtual reality device, an augmented reality device, or any other device. The notification may be conveyed visually via text and/or audially via one or more integrated speakers. For example, one or more objects or people may be highlighted, boxed, etc. on a display of a user's augmented reality glasses to indicate that the one or more objects or people need to sanitize or be sanitized. In embodiments, the sanitizer 134 may notify one or more other users or administrators such as the user's employees, co-workers, clients, contractors, sanitation professionals, etc. As previously discussed, the sanitizer 134 may notify the user and/or others of one or more sanitation evaluations according to the user preferences of configuration.

With reference to the previously introduced example where the sanitizer 134 evaluates the sanitation of the kitchen to be evaluated and determines that the kitchen refrigerator handle and microwave oven handle need to be sanitized, the sanitizer 134 notifies the user that the refrigerator handle and microwave oven handle need to be sanitized on the user's smartphone via visual and audio notification according to user preferences.

The sanitizer 134 may collect new data and re-evaluate a sanitation evaluation (step 220). The sanitizer 134 may collect new data of an asset (person, animal, or object) at periodic time intervals (i.e., once every hour, once per day, etc.) or after a new sanitation event of the person or object. The sanitizer 134 may collect new data in the same manner as described above with respect to collecting data. However, the sanitizer 134 collects new data of the person or object after they have sanitized or been sanitized in response to the user notification. The sanitizer 134 may extract new features from the collected new data in the same manner as described above with respect to extracting features from training data and from previously collected data. The sanitizer 134 may additionally re-evaluate a state of sanitation of the person or object in the same manner as described above with respect to evaluating a state of sanitation and update the person or object's sanitation score or evaluation accordingly.

With reference again to the previously introduced example where the sanitizer 134 notifies the user that the refrigerator handle and microwave oven handle need to be sanitized on the user's smartphone via visual and audio notification, the sanitizer 134 collects new data of the refrigerator handle and microwave oven handle after they have been sanitized, and determines that they have been sufficiently sanitized.

The sanitizer 134 may evaluate and modify the sanitation models 132 (step 222). In the example embodiment, the sanitizer 134 may verify whether the one or more sanitation evaluations were accurate in order to provide a feedback loop for modifying the sanitation models 132. In embodiments, the feedback loop may simply provide a means for a user to indicate whether the one or more sanitation evaluations were accurate, helpful, useful, etc. The feedback loop indication may be triggered via a toggle switch, button, slider, etc. that may be selected by the user manually by hand using a button/touchscreen/etc., by voice, by eye movement, and the like. Based on the sanitizer 134 accurately or inaccurately determining one or more sanitation evaluations, the sanitizer 134 may modify the sanitation models 132 relating to sanitation evaluation. For example, if a user is notified to sanitize an object but the object does not need to be sanitized, the user may submit feedback that the sanitation evaluation was incorrect. Based on feedback received in the above or any other manners, the sanitizer 134 may then modify the sanitation models 132 to more accurately make sanitation evaluations.

With reference to the previously introduced example where the sanitizer 134 collects new data of the refrigerator handle and microwave oven handle after they have been sanitized, and determines that they have been sufficiently sanitized, the user submits feedback by hand using a touchscreen that the evaluation appeared accurate and was helpful. The sanitizer 134 modifies the sanitation models 132 accordingly.

Figure 3:
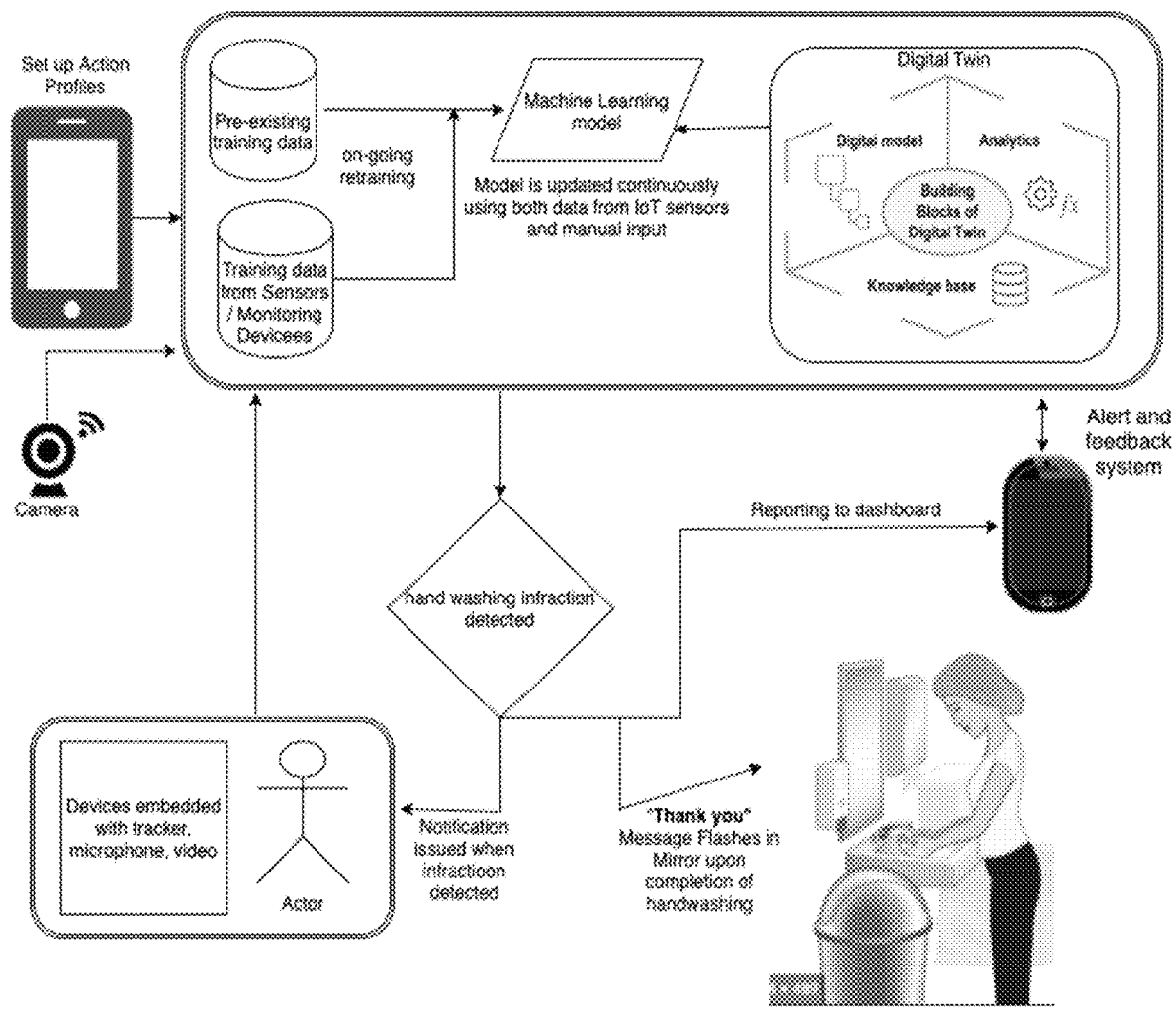
FIG. 3 depicts an exemplary flowchart illustrating the operations of a sanitizer 134 of the sanitation system 100 in sanitizing, in accordance with the exemplary embodiments.

FIG. 3 depicts an exemplary flowchart illustrating the operations of a sanitizer 134 of the sanitation system 100 in sanitizing, in accordance with the exemplary embodiments.

Figure 4:
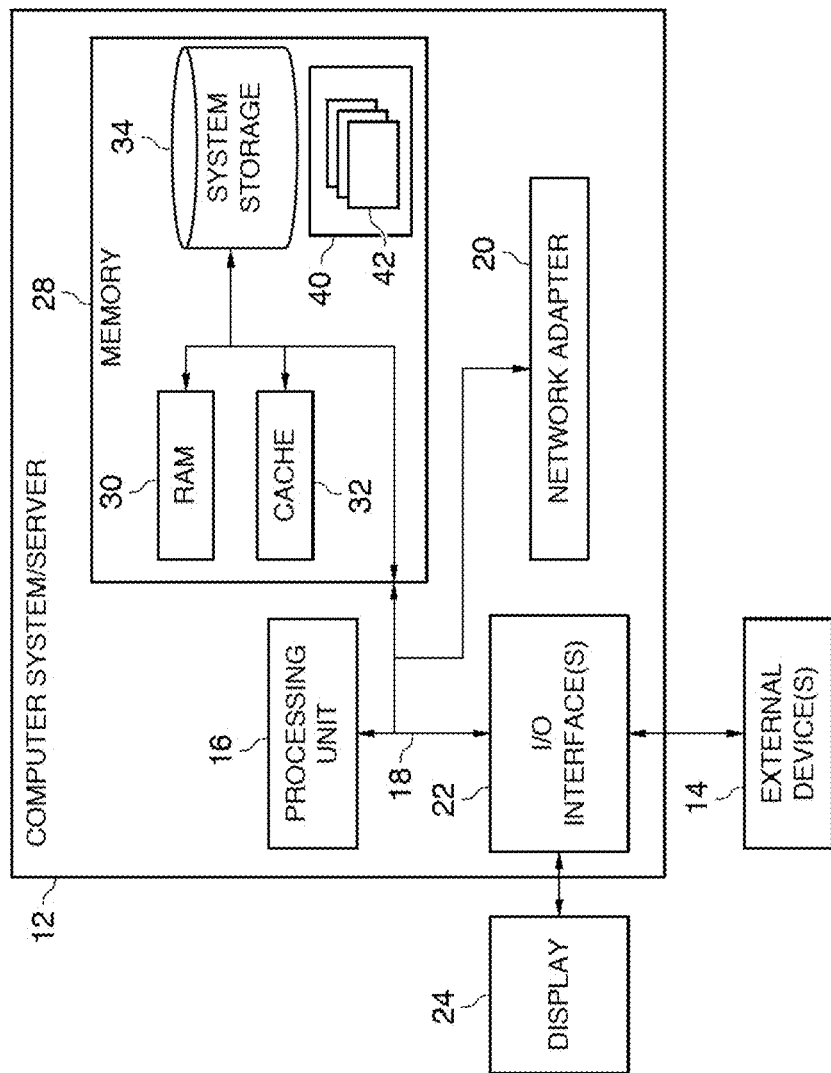
FIG. 4 depicts an exemplary block diagram depicting the hardware components of the sanitation system 100 of FIG. 1, in accordance with the exemplary embodiments.

FIG. 4 depicts a block diagram of devices within the sanitizer 134 of the sanitation system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
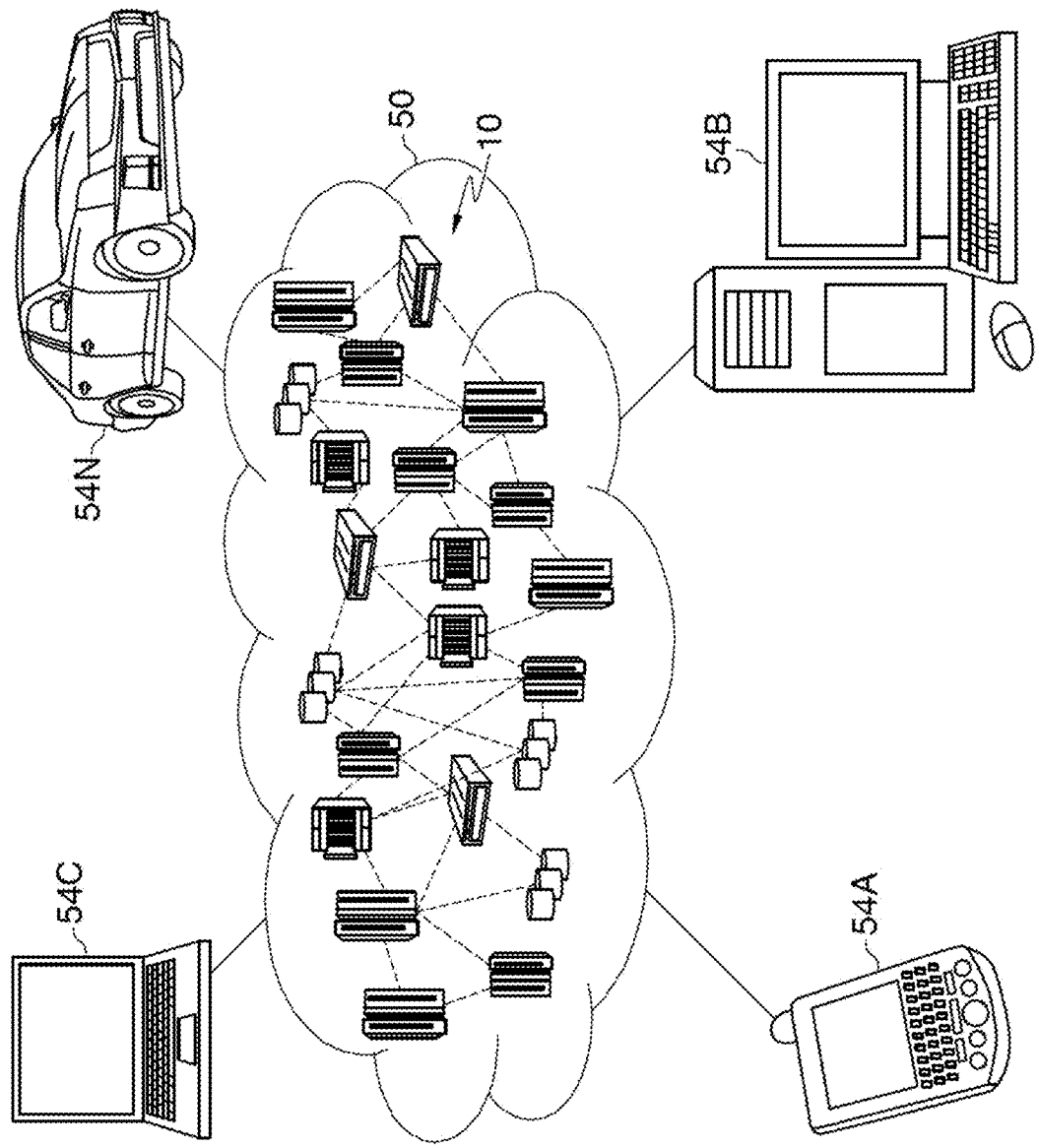
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
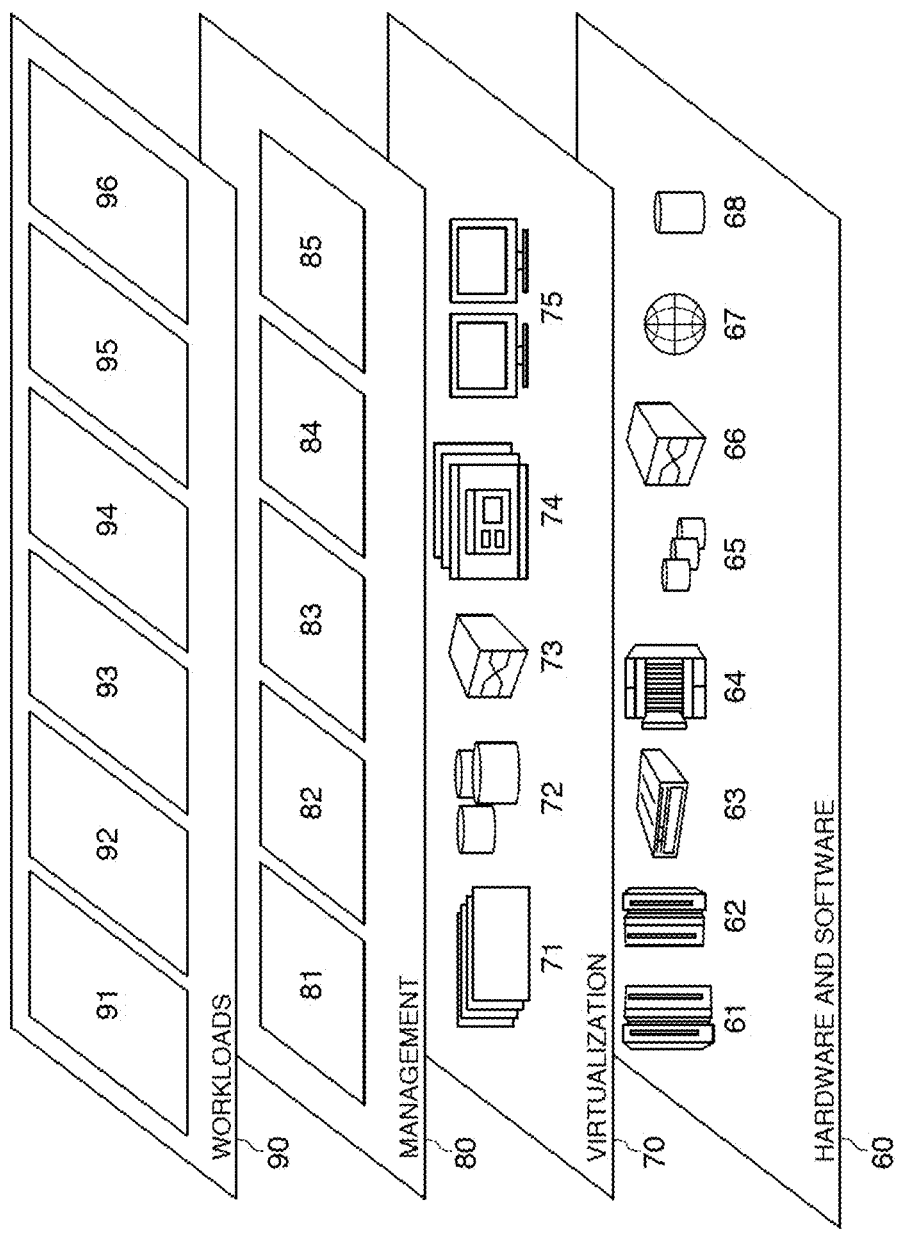
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sanitation evaluation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing sanitation, the method comprising:
    collecting data of one or more assets;
    extracting by one or more machine learning models one or more features from the collected data regarding the one or more assets; and
    evaluating by the one or more machine learning models a state of sanitation of the one or more assets based on applying one or more machine learning models to the extracted features, wherein the one or more models correlate the one or more features with the likelihood of accurately evaluating the state of sanitation.

2. The method of claim 1, further comprising:
    notifying a user of the state of sanitation in the form of visual overlay on one or more pairs of augmented reality glasses.

3. The method of claim 1, further comprising:
    receiving feedback indicative of whether the sanitation evaluation was accurate; and
    adjusting the one or more models based on the received feedback.

4. The method of claim 1, further comprising:
    in response to a sanitization of the one or more assets, collecting new data of the one or more assets, extracting one or more new features from the new data, and evaluating a new state of sanitation of the one or more assets based on the extracted new features.

5. The method of claim 1, further comprising:
    collecting training data, the training data including data of selectively one or more of exposure events and sanitation events;
    extracting training features from the training data; and
    training the one or more models based on the extracted training features.

6. The method of claim 1, wherein:
    the one or more features include exposure events, timestamps of exposure events, severities of exposure events, sanitation events, timestamps of sanitation events, and severities of sanitation events of one or more assets.

7. A computer program product for managing sanitation, the computer program product comprising:
    one or more non-transitory computer-readable storage media and program instructions stored on the one or more non-transitory computer-readable storage media capable of performing a method, the method comprising:
    collecting data of one or more assets;
    extracting by one or more machine learning models one or more features from the collected data regarding the one or more assets; and
    evaluating by the one or more machine learning models a state of sanitation of the one or more assets based on applying one or more machine learning models to the extracted features, wherein the one or more models correlate the one or more features with the likelihood of accurately evaluating the state of sanitation.

8. The computer program product of claim 7, further comprising:
    notifying a user of the state of sanitation in the form of visual overlay on one or more pairs of augmented reality glasses.

9. The computer program product of claim 7, further comprising:
    receiving feedback indicative of whether the sanitation evaluation was accurate; and
    adjusting the one or more models based on the received feedback.

10. The computer program product of claim 7, further comprising:
    in response to a sanitization of the one or more assets, collecting new data of the one or more assets, extracting one or more new features from the new data, and evaluating a new state of sanitation of the one or more assets based on the extracted new features.

11. The computer program product of claim 7, further comprising:
    collecting training data, the training data including data of selectively one or more of exposure events and sanitation events;
    extracting training features from the training data; and
    training the one or more models based on the extracted training features.

12. The computer program product of claim 7, wherein:
    the one or more features include exposure events, timestamps of exposure events, severities of exposure events, sanitation events, timestamps of sanitation events, and severities of sanitation events of one or more assets.

13. A computer system for managing sanitation, the computer system comprising:
    one or more computer processors, one or more computer-readable storage media, and program instructions stored on the one or more of the computer-readable storage media for execution by at least one of the one or more processors capable of performing a method, the method comprising:
    collecting data of one or more assets;
    extracting by one or more machine learning models one or more features from the collected data regarding the one or more assets; and
    evaluating by the one or more machine learning models a state of sanitation of the one or more assets based on applying one or more machine learning models to the extracted features wherein the one or more models correlate the one or more features with the likelihood of accurately evaluating the state of sanitation.

14. The computer system of claim 13, further comprising:
notifying a user of the state of sanitation in the form of visual overlay on one or more pairs of augmented reality glasses.

15. The computer system of claim 13, further comprising:
receiving feedback indicative of whether the sanitation evaluation was accurate; and
adjusting the one or more models based on the received feedback.

16. The computer system of claim 13, further comprising:
in response to a sanitization of the one or more assets, collecting new data of the one or more assets, extracting one or more new features from the new data, and evaluating a new state of sanitation of the one or more assets based on the extracted new features.

17. The computer system of claim 13, further comprising:
collecting training data, the training data including data of selectively one or more of exposure events and sanitation events;
extracting training features from the training data; and
training the one or more models based on the extracted training features.

\* \* \* \* \*